(12) United States Patent
Tong

(10) Patent No.: US 8,134,968 B2
(45) Date of Patent: Mar. 13, 2012

(54) WIRELESS COMMUNICATION METHOD AND WIRELESS COMMUNICATION APPARATUS

(75) Inventor: Fangwei Tong, Yokohama (JP)

(73) Assignee: Kyocera Corporation, Kyoto (JP)

( * ) Notice: Subject to any disclaimer, the term of this patent is extended or adjusted under 35 U.S.C. 154(b) by 234 days.

(21) Appl. No.: 12/516,543

(22) PCT Filed: Nov. 29, 2007

(86) PCT No.: PCT/JP2007/073071
§ 371 (c)(1),
(2), (4) Date: Feb. 8, 2010

(87) PCT Pub. No.: WO2008/069097
PCT Pub. Date: Jun. 12, 2008

(65) Prior Publication Data
US 2010/0135223 A1 Jun. 3, 2010

(30) Foreign Application Priority Data

Nov. 29, 2006 (JP) ................................. 2006-322645

(51) Int. Cl.
*H04W 4/00* (2009.01)
*H04W 72/00* (2009.01)
(52) U.S. Cl. ...................................... 370/329; 455/450
(58) Field of Classification Search .................... None
See application file for complete search history.

(56) References Cited

U.S. PATENT DOCUMENTS

| 5,909,649 A | 6/1999 | Saunders ...................... 455/450 |
| 6,466,557 B1 | 10/2002 | Doi .............................. 370/332 |
| 2006/0099955 A1* | 5/2006 | Kasapi et al. ................. 455/450 |

FOREIGN PATENT DOCUMENTS

| JP | 07-255078 | 10/1995 |
| JP | 09-215052 | 8/1997 |
| JP | 2002-198933 | 7/2002 |
| JP | 2003-259430 | 9/2003 |

* cited by examiner

*Primary Examiner* — Chirag Shah
*Assistant Examiner* — Srinivasa Reddivalam
(74) *Attorney, Agent, or Firm* — DLA Piper LLP (US)

(57) ABSTRACT

When wireless communications are performed with a plurality of wireless stations using a spatial division multiple access scheme, there are included a moving speed grasp step, a priority grasp step, a channel assignment order determination step, a channel assignment order adjustment step for modifying, based on the priority grasped by the priority grasp step, so that the high-priority wireless station is placed high in the channel assignment order and a channel assignment control step for controlling, for the wireless stations after the wireless station to which a channel for frequency division multiple access has been assigned based on the channel assignment order, so that at least a channel for spatial division multiple access which has been spatially divided for the last channel is assigned.

4 Claims, 5 Drawing Sheets

| Channel No. | C10 | C20 | C30 | ... | C(N-1)0 | CN0 | Remarks |
|---|---|---|---|---|---|---|---|
| Assignment order | 1 | 2 | 3 | | N-1 | N | Basic channel |
| Channel No. | C11 | C21 | C31 | ... | C(N-1)1 | CN1 | Spatial channel |
| Assignment order | N+(N-1)L+1 | N+(N-2)L+1 | N+(N-3)L+1 | | N+1 | N+1 | |
| Channel No. | C12 | C22 | C32 | ... | C(N-1)2 | CN2 | Spatial channel |
| Assignment order | N+(N-1)L+2 | N+(N-2)L+2 | N+(N-3)L+2 | | N+L+2 | N+2 | |
| Channel No. | C1L | C2L | C3L | ... | C(N-1)L | CNL | Spatial channel |
| Assignment order | N+NL | N+(N-1)L | N+(N-2)L | | N+2L | N+L | |

WIRELESS COMMUNICATION METHOD AND WIRELESS COMMUNICATION APPARATUS

CROSS-REFERENCE TO THE RELATED APPLICATIONS

Present application is a national stage of international application No. PCT/JP2007/073071 filed on Nov. 29, 2009. This application also claims the benefit of priority under 35 USC 119 to Japanese Patent Application No. 2006-322645 filed Nov. 29, 2006, the entire contents of which are incorporated herein by reference.

TECHNICAL FIELD

The present invention relates to a wireless communication method and a wireless communication apparatus and, in particular, to a wireless communication method and a wireless communication apparatus used for a wireless system that performs spatial division multiple accesses (SDMA) by using adaptive array antennas equipped in a base station.

BACKGROUND ART

Conventionally, a base station assigns a wireless channel to a mobile station. However, on this occasion, the channel has been assigned at random without considering a moving state of the mobile station. For the wireless channel assignment, "channel assignment scheme" (see Patent Document 1) and "spatial division multiple access wireless communication system and channel assignment method thereof" (see Patent Document 2) are known. For the above mentioned "channel assignment scheme", a base station gives a priority to wireless channels and measures interference wave power of the wireless channels. Then the base station increases the priority if the interference wave power is less than a certain value and decreases the priority if the interference wave power is equal to or greater than the certain value, then determines the priority of the channels in order of priority and assigns the wireless channels to the mobile station.

For the above mentioned "spatial division multiple access wireless communication system and channel assignment method thereof", a distance metric is calculated with respect to each pair of wireless communication apparatuses that shares a channel. Then, when the calculated distance metric satisfies a required index, a spatial channel is assigned to the wireless communication apparatuses. On the contrary, when the calculated distance metric, does not satisfy the required index, one of the wireless communication apparatuses is reassigned to a new channel, or handover is performed. Patent Document 1: Japanese Patent Application Laid-Open Publication No. 7-255078 Patent Document 2: Japanese Patent Application Laid-Open Publication No. 9-215052

SUMMARY OF INVENTION

Technical Problem

However, in the conventional "channel assignment scheme" and "spatial division multiple access wireless communication system and channel assignment method thereof", the moving state and priority of a mobile station have not been considered for the channel assignment.

First of all, in the case of spatial division multiple access (SDMA), a plurality of mobile stations that are subjected to spatial division multiple access use the same spatial channels. Then, the plurality of mobile stations are spatially distinguished according to a beam pattern of adaptive array antennas (hereinafter referred to as "AAA") equipped in a base station, thus avoid mutual interferences. The base station uses a reversibility of propagation path of the TDD (Time Division Duplex) scheme communication system in order to form the beam pattern correctly. In other words, the base station calculates the weight of AAA based on an upward link signal (a signal transmitted from the mobile station to the base station) received by itself and corrects it if necessary. Then, the base station multiplies a downward link signal (a signal transmitted from the base station to the mobile station) by the weight and transmits.

The weight to be multiplied on the downward link signal is calculated based on the upward link signal. Therefore, if the mobile station is moving at a high speed when the base station transmits a downward signal, the mobile station is away from the position where the upward signal has been transmitted. Because of this, the interference cannot be suppressed by the beam pattern, which deteriorates the reception quality of the mobile station, causing a decrease in the system throughput. In other words, in a method that a base station assigns channels at random, the base station assigns channels at random without considering the moving state of the mobile station. Therefore, if there is a mobile station that moves at a high speed, interference occurs and the system Throughput decreases.

On the other hand, in the "channel assignment scheme", since the position of a base station is always the same, the priority of a mobile station usually becomes stable after the base station has executed a certain convergence processing and has learned based on the execution, which enables the base station to assign channels. However, the "channel assignment scheme" does not consider the characteristics related to SDMA such as terminal movement. Therefore, the interference power when the base station has assigned channels to a mobile terminal is different from that when the base station assigns channels to a static terminal. Because of this, the channel priority always changes. Thus the base station cannot determine the priority order of the mobile terminal, and as a result, can only assign channels at random. In addition, in the "spatial division multiple access wireless communication system and channel assignment method thereof", terminal movement is not considered. Therefore, even if the distance metric satisfies the required index, there is a possibility that the reception quality is deteriorated due to terminal movement. In this case, the system performance decreases.

The above mentioned problems are those occurred when the terminal movement is not considered. Next, with respect to the above mentioned problems, when a base station performs channel assignment considering the terminal movement only, the following problem further occurs. In other words, for example, when a high-priority terminal which performs VoIP (Voice over Internet Protocol) and is QoS (Quality of Service) guaranteed moves, if a spatial channel is assigned actively to the terminal, there is a possibility that interference may occur between the terminal and another terminal to which a different spatial channel having the same frequency as that of the spatial channel has been assigned.

In that case, a problem such as a high-priority mobile station cannot receive appropriate services occurs. Therefore, an object of the present invention is to provide a wireless communication method and a wireless communication apparatus that can improve the system performance when wireless channels are assigned to a mobile station, and as a result, can improve the transmission performance of the system and the convenience thereof as well.

Solution To Problems

In order to achieve the above object, a wireless communication method according to the present invention is a wireless communication method of a wireless communication apparatus for performing wireless communications with a plurality of wireless stations using a spatial division multiple access scheme, comprising:
- a moving speed grasp step of grasping a moving speed of the plurality of wireless stations;
- a priority grasp step of grasping a priority of each of the wireless stations;
- a channel assignment order determination step of determining, based on the moving speed grasped by the moving speed grasp step, a channel assignment order to the plurality of wireless stations so that channel assignment is performed to the plurality of wireless stations from a wireless station having a highest moving speed;
- a channel assignment order adjustment step of modifying the channel assignment order, when the priority has been grasped in the priority grasp step, based on the grasped priority, so that the channel assignment order with respect to the high-priority wireless station is placed high; and
- a channel assignment control step of controlling so that assignment is performed from channels for frequency division multiple access based on the channel assignment order, and for wireless stations after a wireless station to which the channel for frequency division multiple access is last assigned, at least a channel for spatial division multiple access that has been spatially divided for the last channel for frequency division multiple access is assigned.

In addition, in the wireless communication method according to an embodiment of the present invention, in the channel assignment control step, it is preferable to control, for the wireless stations after the wireless station to which the channel for spatial division multiple access is last assigned, so that at least a channel for spatial division multiple access for a channel for frequency division multiple access that has been assigned just before the last channel for frequency division multiple access is assigned. In addition, in the wireless communication method according to another embodiment of the present invention, it is preferable that the moving speed grasp step is performed at a predetermined cycle, and the predetermined cycle is set to be lengthened when a fluctuation degree of the moving speed of the wireless station is less than a predetermined threshold, and when it is greater than the predetermined threshold, the cycle is set to be shortened.

Further, a wireless communication apparatus according to the present invention is a wireless communication apparatus for performing wireless communications with a plurality of wireless stations using a spatial division multiple access scheme, comprising:
- a moving speed grasp unit for grasping a moving speed of the plurality of wireless stations;
- a priority grasp unit for grasping priority of each of the wireless stations;
- a channel assignment order determination unit for determining, based on the moving speed grasped by the moving speed grasp unit, a channel assignment order to the plurality of wireless stations so that channel assignment is performed to the plurality of wireless stations from a wireless station having a highest moving speed;
- a channel assignment order adjustment unit for modifying the channel assignment order, when the priority has been grasped by the priority grasp unit, based on the grasped priority, so that the channel assignment order with respect to the high-priority wireless station is placed high; and
- a channel assignment control unit for controlling to assign channels for frequency division multiple access and channels for spatial division multiple access based on the channel assignment order, wherein the channel assignment control unit controls to assign to the wireless stations from the channels for frequency division multiple access based on the channel assignment order, and for the wireless stations after the wireless station to which the channel for frequency division multiple access is last assigned, controls so that at least a channel for spatial division multiple access that has been spatially divided for the last channel for frequency division multiple access is assigned.

Advantageous Effects on Invention

According to the present invention, the transmission performance of a system can be improved when assignment of wireless channels is performed to a mobile station. As a result of that, data receiving time at the mobile station is shortened. Therefore the system capacity can be improved. In addition, since assignment of spatial channels to high-priority terminals can be avoided as much as possible, it is possible to ensure the communication quality to the high-priority terminals.

DESCRIPTION OF THE NUMBERS

10. Wireless communication apparatus
11. Speed estimation unit
12. Sort unit
13. QoS control unit
14. Channel assignment control unit
15. Cycle control unit
16-1~16M. Mobile station moving speed estimation unit
17. AAA transmission/reception unit

DESCRIPTION OF EMBODIMENTS

Figure 1:
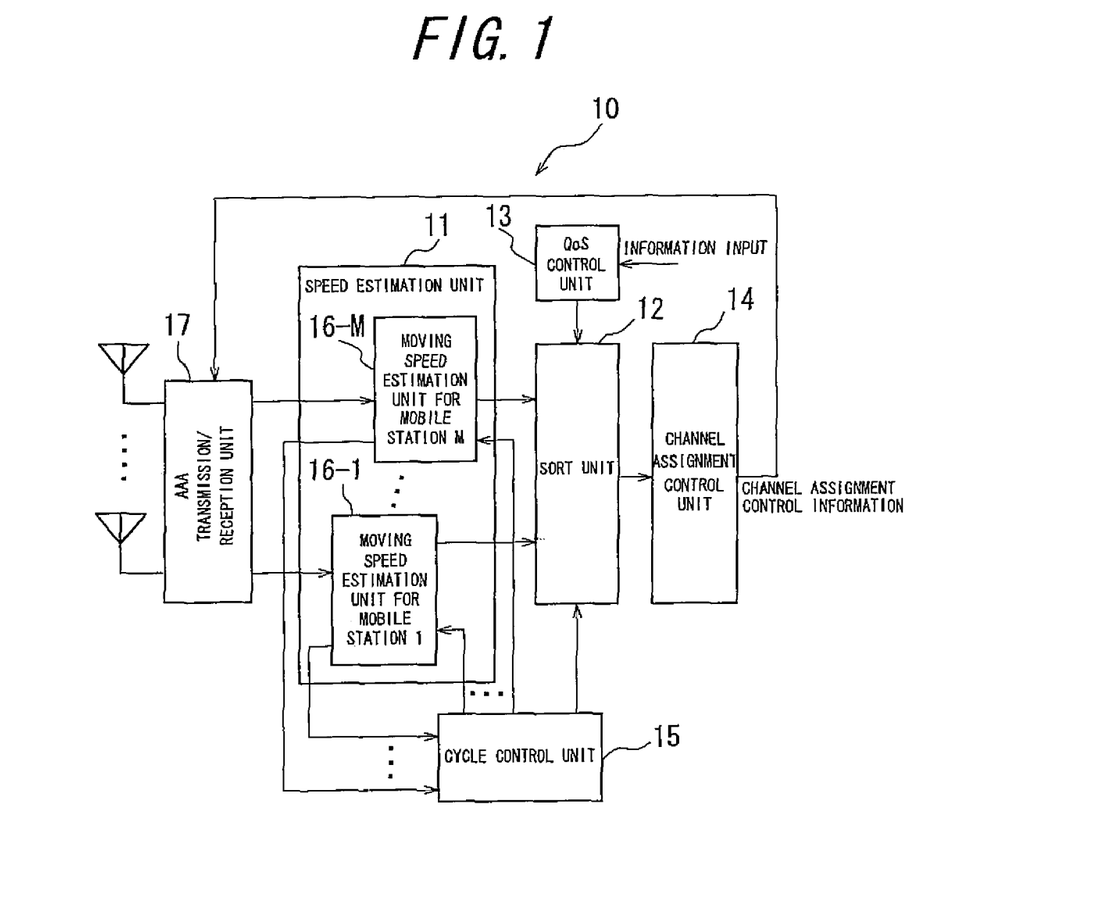
FIG. 1 is a block diagram showing a configuration of a wireless communication apparatus according to an embodiment of the present invention.

Hereinafter, preferred embodiments of the present invention is described with reference to the accompanying drawings. FIG. 1 is a block diagram showing a configuration of a wireless communication apparatus according to an embodiment of the present invention. As shown in FIG. 1, a wireless communication apparatus 10 includes a speed estimation unit 11, a sort unit 12, a QoS (Quality of Service) control unit 13, a channel assignment control unit 14, a cycle control unit 15 and a transmission/reception unit 17. Here, the wireless communication apparatus 10 is functionally equivalent to a wireless base station. The wireless communication apparatus 10 is equipped with adaptive array antennas and performs wireless communications with a plurality of wireless stations (mobile stations) using a spatial division multiple access (SDMA) scheme.

The speed estimation unit 11 includes a plurality of mobile station moving speed estimation units 16-1~16-M corresponding to the plurality (1~M) of mobile stations (wireless stations) and estimates and grasps the moving speed of each mobile station. The received information from the AAA transmission/reception unit 17 is inputted to each of the mobile station moving speed estimation units 16-1~16-M, and the output information from each of the mobile station moving speed estimation units 16-1~16-M is inputted to the sort unit 12 and the cycle control unit 15. Here, the AAA transmission/reception unit 17 has, as in the case of the conventional art, a known construction and operation. Therefore its explanation is omitted here. For the moving speed, in the case of a wireless communication system that uses the moving speed information, the moving speed information may be used directly, or the moving speed may be estimated based on the phase fluctuation of a known portion (e.g. training sequence) of the received signal of each mobile station. Further, a known phasing speed (equivalent to a moving speed) estimation method (see Japanese Patent Application Laid-Open Publication No. 6-13956) may be used.

The sort unit 12 sorts in order of the speed of each mobile station estimated by the speed estimation unit 11. For example, assuming that there are M units of mobile stations (mobile station #1, mobile station #2, ..., mobile station #M), and the magnitude of moving speed is (mobile station #1>mobile station #2> ... >mobile station #M), the result of sort is in order of mobile station #1, mobile station #2, ..., mobile station #M. To this sort unit 12, the output information from each of the mobile station moving speed estimation units 16-1~16-M, the QoS control unit 13 and the cycle control unit 15 is inputted, and the output information from the sort unit 12 is inputted to the channel assignment control unit 14.

The QoS control unit 13 grasps the priority of QoS guaranteed mobile station and adjusts the sort order based on the grasped priority. More specifically, the QoS control unit 13 adjusts the sort order of important mobile stations (e.g. VoIP (Voice over Internet Protocol) mobile station or the like) according to the information of important mobile terminals (e.g. an important mobile station No.) inputted. Further, more specifically, the QoS control unit 13 adjusts, for example, so that the important mobile station will be placed top in the sort order of the speed. If there are many important mobile stations, the control unit adjusts so that all of the important mobile stations will be placed high in order of the speed (that is, the order sorted based on the speed) (refer to FIG. 4).

As another adjustment method, the QoS control unit 13 monitors the number of spatial multiplexes and the communication speed of the important mobile station. At first, the QoS control unit 13 adjusts the sort order to that of one step before, and based on the adjustment, confirms if the number of spatial multiplexes has decreased or the communication speed has been improved. Then, the QoS control unit 13 finishes the adjustment of the sort order if the communication peed has been improved as a result of the confirmation, then if not improved, adjusts to the step which is further one step before. There might be other adjustment methods, however, they are not mentioned here. In addition, if there is no important mobile station, the QoS control unit 13 does not perform adjustments. The channel assignment control unit 14 controls so that basic channels (communication channels) and spatial channels are assigned to each mobile station based on the sort result adjusted by the QoS control unit 13. The concrete method is described below.

Figure 2:
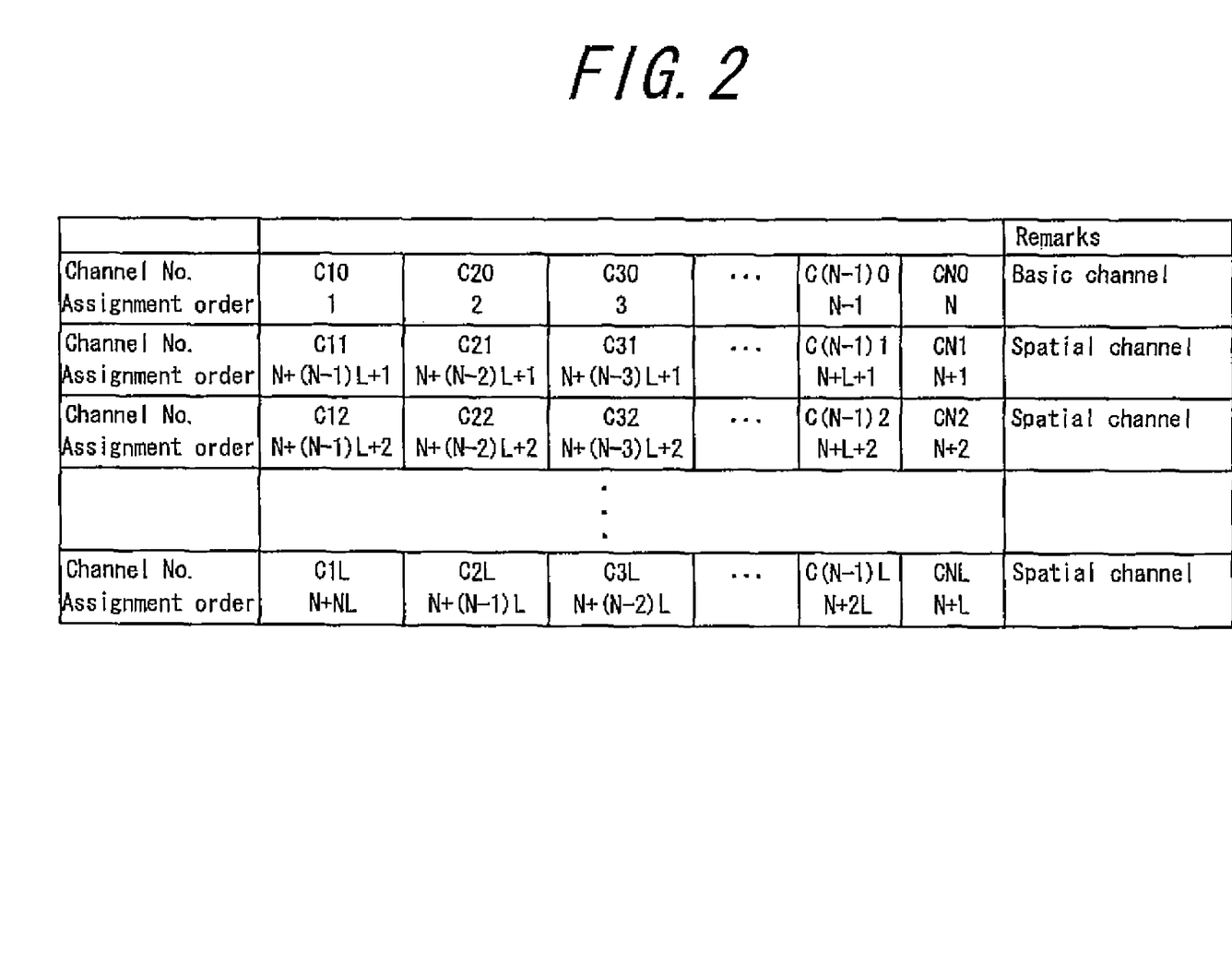
FIG. 2 is an explanatory diagram showing an assignment order by a channel assignment control unit of FIG. 1.

Assume that there are N number (C10, C20, ..., CN0) of basic channels and L number (C11, C12, ..., C1L) of spatial channels (channels that have the same frequency and time slot as those of the C10 and are spatially divided) of the basic channel C10. In addition, with respect to the basic channel C20, spatial channels are expressed by C21, C22, ..., C2L, and with respect to the basic channel CN0, spatial channels are expressed by CN1, ..., CNL. Here, it is assumed that the number of mobile stations (M) is greater than the number of basic channels (N) (M>N). On the other hand, in the case of M≦N, it can be said that the number of basic channels are sufficient. Therefore assignment of the spatial channels is not required.

The channel assignment control unit 14 controls to assign the basic channels and the spatial channels according to the sort order (for the convenience of explanation, the sort order is assumed as #1, ..., #M) which has been sorted by the sort unit 12 and adjusted by the QoS control unit 13. The channel assignment control information outputted from the channel assignment control unit 14 is inputted to the AAA transmission/reception unit 17. FIG. 2 is an explanatory diagram showing an assignment order by the channel assignment control unit of FIG. 1. As shown in FIG. 2, the channel assignment control unit 14 controls so that the channel C10 (basic channel) of assignment order 1 is assigned to the mobile station #1 among the sorted mobile stations of #1, ..., #M and the channel C20 of the assignment order 2 is assigned to the mobile station #2. After that, in the same manner, the channel assignment control unit 14 assigns channels up to the mobile station #M (the channel with the assignment order of M to the mobile station #M) corresponding to the assignment order.

The cycle control unit 15 controls speed estimation and sort cycle of each mobile station. The cycle control unit 15 adjusts to lengthen the cycle when the moving speed of the mobile station does not fluctuate a lot, and to shorten the cycle when the moving speed of the mobile station fluctuates a lot. To the cycle control unit 15, the output information from each of the mobile station moving speed estimation units 16-1~16-M is inputted, and the output information from the cycle control unit 15 is inputted to each of the mobile station moving speed estimation units 16-1~16-M and the sort unit 12.

Figure 3:
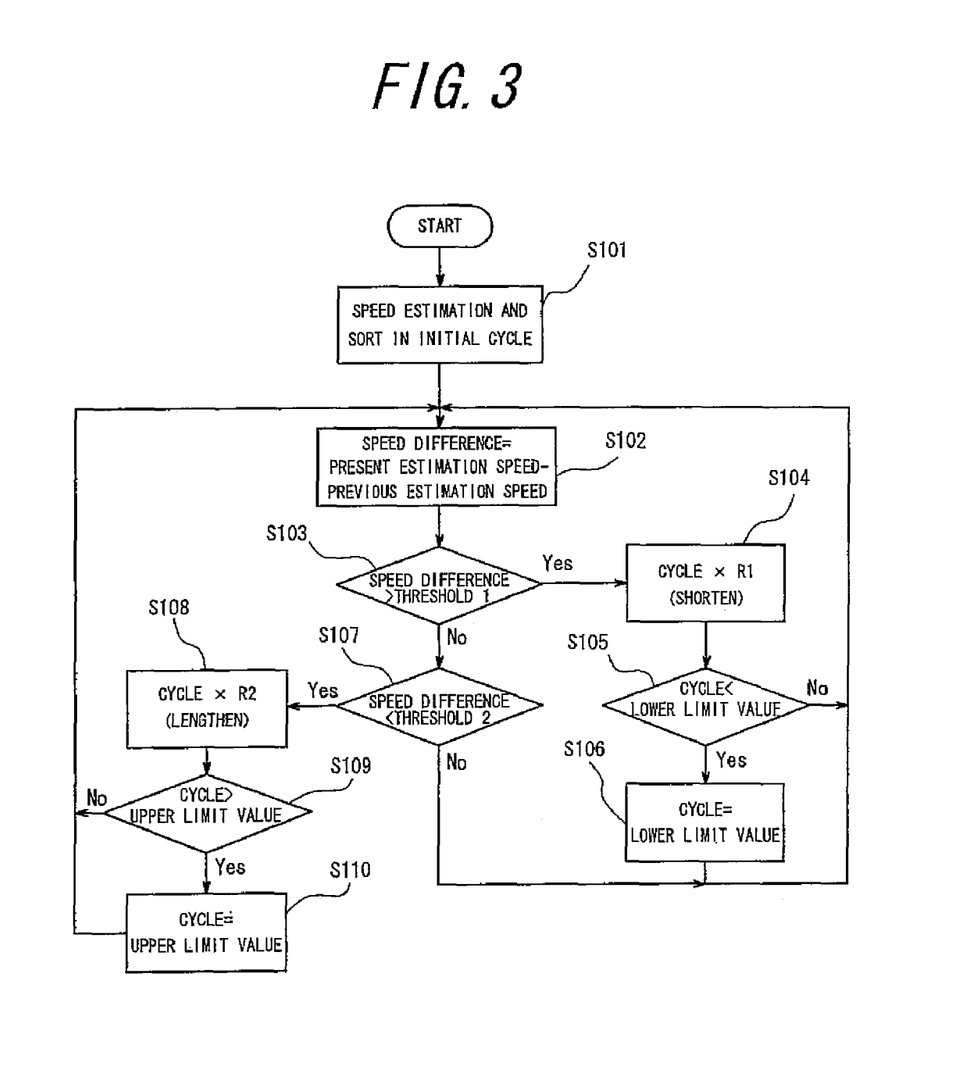
FIG. 3 is a flow chart showing a control process flow of a cycle control unit of FIG. 1.

FIG. 3 is a flow chart showing a control process flow of the cycle control unit of FIG. 1. As shown in FIG. 3, at first, speed estimation and sort are performed in the initial cycle (step S101). Next, the cycle control unit 15 subtracts the previous estimation speed from the present estimation speed to obtain a speed difference (speed difference=present estimation speed−previous estimation speed) (step S102). After that, the cycle control unit 15 determines if the obtained speed difference is greater than the threshold 1 (speed difference>threshold 1) (step S103).

If the speed difference is greater than the threshold 1 (yes) as a result of the determination in step S103, the cycle control unit 15 multiplies the cycle by the coefficient R1 (R1<1) (cycle×R1) to shorten the cycle (step S104). Then, the cycle control unit 15 determines if the shortened cycle is less than the lower limit value (cycle<lower limit value) (step S105), If the cycle is less than the lower limit value (yes) as a result of the determination in step S105, the cycle control unit 15 sets the cycle to the lower limit value (cycle=lower limit value) (step S106). After that, if the cycle is not less than the lower limit value (no), the process returns to step S102 without changing the cycle. On the other hand, if the speed difference is not greater than the threshold 1 (no) as a result of the determination in step S103, the cycle control unit 15 determines if the speed difference is less than the threshold 2 (speed difference<threshold 2) (step S107).

If the speed difference is less than the threshold 2 (yes) as a result of the determination in step S107, the cycle control unit 15 multiplies the cycle by the coefficient R2 (R2>1) (cycle×R2) to lengthen the cycle (step S108). Then the cycle control unit 15 determines if the lengthened cycle is greater than the upper limit value (cycle>upper limit value) (step S109). If the cycle is greater than the upper limit value (yes) as a result of the determination in step S109, the cycle control unit 15 sets the cycle to the upper limit value (cycle=upper limit value) (step S110). After that, if the cycle is not greater than the upper limit value (no), the process returns to step S102 without changing the cycle. On the other hand, if the speed difference is not less than the threshold 2 (no) as a result of the determination in step S107, the process returns to step S102 without changing the cycle.

Here, it is desirable that speed estimation and sort cycle in the initial cycle, threshold 1, threshold 2, R1(R1<1), R2(R2>1) or the like are set according to the requests when a system is specifically designed. As an example, the initial cycle, the threshold 1, the threshold 2, R1, R2, the upper limit value and the lower limit value are set to 1~2 sec., 5~10 kM/h, 1~2 kM/h, 0.5~0.9, 1.1~1.5, 1~10 minutes, and 0.05~0.3 sec. respectively.

Figure 4:
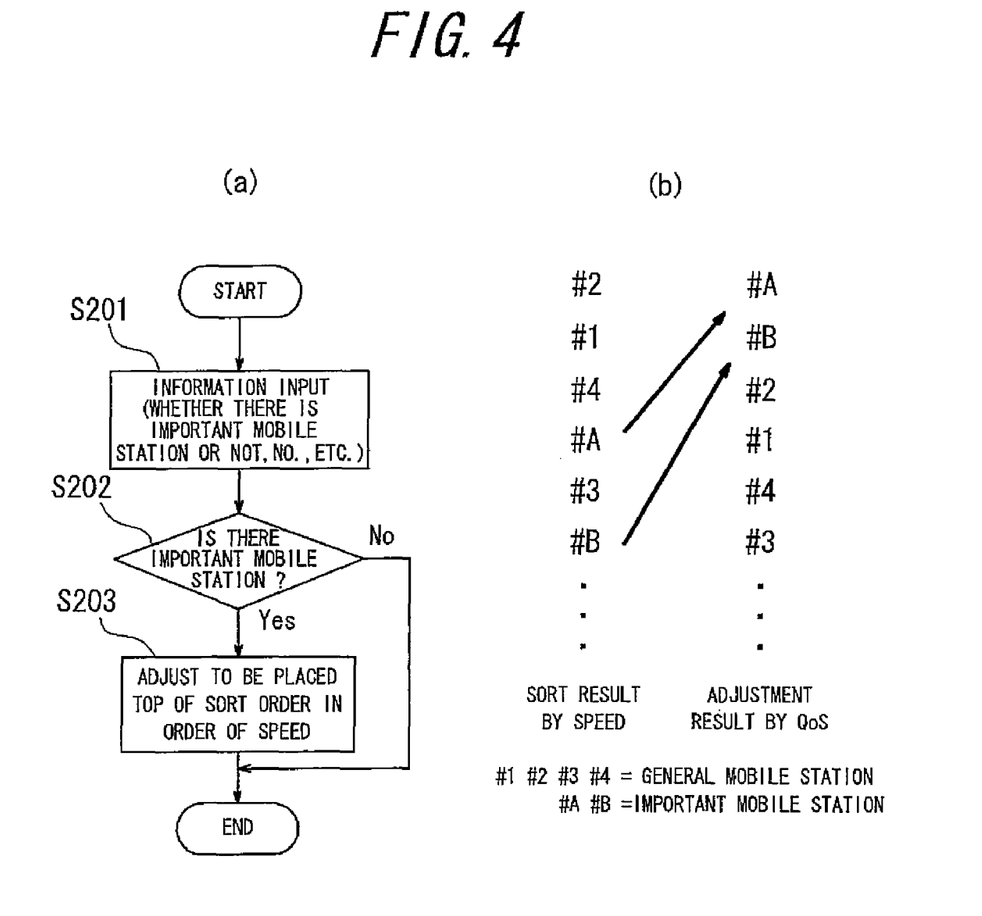
FIG. 4 illustrates an adjustment by a QoS control unit of FIG. 1. (a) is a flow chart showing an adjustment process flow, and (b) is a concrete example of the adjustment.

FIG. 4 illustrates an adjustment by a QoS control unit of FIG. 1 wherein (a) is a flow chart showing an adjustment process flow, and (b) is a concrete example of the adjustment. As shown in FIG. 4($a$), at first, when various information such as the information indicating whether there is important mobile station or not, No. or the like is inputted to the QoS control unit 13 (step S201), the QoS control unit 13 determines if there is information of important mobile station (step S202). If there is no information of important mobile station (no) as a result of the determination, the QoS control unit 13 does not perform adjustments. In addition, if there is the information of important mobile station (yes) as a result of the determination, the QoS control unit 13 adjusts so that the important mobile stations are placed high in the sort order of the moving speed (step S203), and after that, the process is finished. Here, when the adjustment using the QoS control unit 13 is not performed, channel assignment is performed according to the sort order based on the order of moving speed. In other words, as shown in FIG. 4($b$), the QoS control unit 13 performs adjustments by QoS with respect to the sort result by moving speed of the mobile stations so that the important mobile stations (#A and #B) are placed high in the sort order. Here, in FIG. 4($b$), #1, #2, #3 and #4 indicate a general mobile station, and #A and #B indicates an important mobile station.

As mentioned above, on the occasion of channel assignment, when terminals (mobile stations) are sorted in order of moving speed and the sort result is adjusted by the QoS control unit 13, the channel assignment control unit 14 controls so that basic wireless channels are sequentially assigned according to the adjusted sort order. Then, the channel assignment control unit 14 controls, after all of the basic wireless channels have been assigned, so that the spatial channels of the basic wireless channel which has been last assigned are assigned to the next mobile station. Then, the channel assignment control unit 14 assigns, after all of the spatial channels of the basic wireless channel have been assigned, the spatial channel of the basic wireless channel, which has been assigned to the mobile station whose sort order is the second highest among the mobile stations to which the basic wireless channels have been assigned, to the next mobile station. This process (step S301: not shown) is repeated to assign channels to all of the mobile stations.

Here, the basic wireless channel (basic channel) means a channel for frequency division multiple access, and refers to available carrier (frequency) and time slot. The spatial channel refers to a channel (a channel for spatial division multiple access) which is spatially multiplexed by a beam pattern of AAA by using the same frequency and time slot as those of the basic channel. A basic channel becomes a spatial channel when it has been spatially multiplexed. However, with respect to a basic channel which has been spatially multiplexed and has become a spatial channel, for convenience of explanation, it is referred to as a basic channel without making particular distinction.

Figure 5:
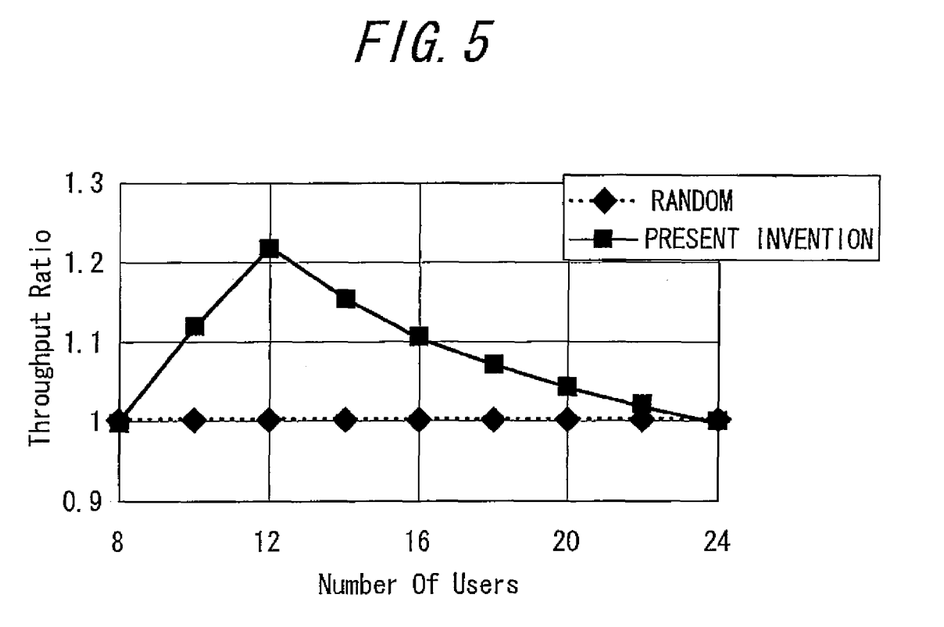
FIG. 5 is an explanatory diagram showing a result of the comparison between the channel assignment method according to the present invention and the random assignment method by using a graph.

FIG. 5 is an explanatory diagram showing a result of the comparison between the channel assignment method according to the present invention and the random assignment method by using a graph. Here, throughputs are compared on the condition that the number of basic channels is 8 (N=8), the number of spatial channels is 2 (L=2), and the moving speeds of mobile stations are equally distributed to 0 km/h and 40 km/h. In order to verify the effects of the channel assignment method according to the present invention, based on the actual field test data, the improvement effects of the system throughput under the above mentioned conditions are shown by comparing with the random assignment method. As shown in FIG. 5, assuming that the performance using the random assignment method is 1, it can be seen that the throughput using the channel assignment method according to the present invention could obtain 22% improvement at maximum (throughput ratio: about 1.22) relative to the random assignment method.

As mentioned above, the wireless communication apparatus 10 according to the present invention includes a moving speed grasp unit (speed estimation unit 11) for grasping the moving speed of a plurality of wireless stations, a priority grasp unit (QoS control unit 13) for grasping the priority of each wireless station (mobile station), a channel assignment order determination unit (sort unit 12) for determining a channel assignment order to the plurality of wireless stations so that, based on the moving speed grasped by the moving speed grasp unit, channel assignment is performed to the plurality of wireless stations from the wireless station having the highest moving speed, a channel assignment order adjustment unit (QoS control unit 13) for modifying the channel assignment order so that, when the priority is grasped by the priority grasp unit, based on the grasped priority, the channel assignment order is placed high for the high-priority wireless station, and a channel assignment control unit (channel assignment control unit 14) for controlling to assign the channels for frequency division multiple access and the channels for spatial division multiple access based on the channel assignment order. Then the channel assignment control unit assigns from the channels for frequency division multiple access based on the channel assignment order, and for the wireless stations after the wireless station to which the channel for frequency division multiple access has been last assigned, controls so that at least a channel for spatial division multiple access that has been spatially divided for the last channel for frequency division multiplex access is assigned.

Further, the wireless communication method according to the present invention includes a moving speed grasp step (step S101) for grasping the moving speed of a plurality of wireless stations, a priority grasp step (step S202) for grasping the priority of each wireless station (mobile station), a channel assignment order determination step (step S101) for determining a channel assignment order to the plurality of wireless stations so that, based on the moving speed grasped by the moving speed grasp step, channel assignment is performed to the plurality of wireless stations from the wireless station having the highest moving speed, a channel assignment order adjustment step (step S203) for modifying the channel assignment order so that, when the priority is grasped by the priority grasp step, based on the grasped priority, the channel assignment order is placed high for the high-priority wireless station, and a channel assignment control step (step S301) for assigning from the channels for frequency division multiple access based on the channel assignment order, and for the wireless stations after the wireless station to which the channel for frequency assignment multiple access has been last assigned, controlling so that at least a channel for spatial division multiple access that has been spatially divided for the last channel for the frequency division multiple access is assigned.

In this manner, for channel assignment of the SDMA wireless communication system, sort is performed in order of the moving speed of terminals (mobile stations), channels are assigned in order from basic channels to allow spatial channels to be assigned to between terminals whose communication speeds are slow as much as possible and assignment pattern (assignment order) of spatial channels is modified based on the priority (QoS) of terminals as well.

In other words, by assigning basic channels and spatial channels appropriately to a mobile station, the system performance, for example, the system throughput, can be improved. As a result of this, the communication speed of a terminal is shortened, thus the system capacity can be improved. In addition, since a stable and high-speed communication environment can be provided for important mobile stations, QoS can be guaranteed. Further, although the present invention has been described based on the above mentioned embodiments, it should be noted that the present invention is not limited to the embodiments, and encompasses embodiments that are performed as modifications without departing from the spirit of the invention.

The invention claimed is:

1. A wireless communication method of a wireless communication apparatus for performing wireless communications with a plurality of wireless stations using a spatial division multiple access scheme, comprising:
    a moving speed grasp step of grasping a moving speed of the plurality of wireless stations;
    a priority grasp step of grasping a priority of each of the wireless stations;
    a channel assignment order determination step of determining, based on the moving speed grasped by the moving speed grasp step, a channel assignment order to the plurality of wireless stations so that channel assignment is performed to the plurality of wireless stations from a wireless station having a highest moving speed;
    a channel assignment order adjustment step of modifying the channel assignment order, when the priority has been grasped in the priority grasp step, based on the grasped priority, so that the channel assignment order with respect to the high-priority wireless station is placed high; and
    a channel assignment control step of controlling so that assignment is performed from channels for frequency division multiple access based on the channel assignment order, and for wireless stations after a wireless station to which the channel for frequency division multiple access is last assigned, at least a channel for spatial division multiple access that has been spatially divided for the last channel for frequency division multiple access is assigned.

2. The wireless communication method according to claim 1, wherein in the channel assignment control step, for the wireless stations after the wireless station to which the channel for spatial division multiple access is last assigned, control is performed so that at least a channel for spatial division multiple access for a channel for frequency division multiple access that has been assigned just before the last channel for frequency division multiple access is assigned.

3. The wireless communication method according to claim 1, wherein the moving speed grasp step is performed at a predetermined cycle, and the predetermined cycle is set to be lengthened when a fluctuation degree of the moving speed of the wireless station is less than a predetermined threshold, and when it is greater than the predetermined threshold, the cycle is set to be shortened.

4. A wireless communication apparatus for performing wireless communications with a plurality of wireless stations using a spatial division multiple access scheme, comprising:
    a moving speed grasp unit for grasping a moving speed of the plurality of wireless stations;
    a priority grasp unit for grasping priority of each of the wireless stations;
    a channel assignment order determination unit for determining, based on the moving speed grasped by the moving speed grasp unit; a channel assignment order to the plurality of wireless stations so that channel assignment is performed to the plurality of wireless stations from a wireless station having a highest moving speed;
    a channel assignment order adjustment unit for modifying the channel assignment order, when the information indicating the priority has been grasped by the priority grasp unit, based on the grasped priority, so that the channel assignment order with respect to the high-priority wireless station is placed high; and
    a channel assignment control unit for controlling to assign channels for frequency division multiple access and channels for spatial division multiple access based on the channel assignment order, wherein the channel assignment control unit controls to assign to the wireless stations from the channels for frequency division multiple access based on the channel assignment order, and for the wireless stations after the wireless station to which the channel for frequency division multiple access is last assigned, controls so that at least a channel for spatial division multiple access that has been spatially divided for the last channel for frequency division multiple access is assigned.

* * * * *